US009773322B2

(12) United States Patent
Uchiyama et al.

(10) Patent No.: US 9,773,322 B2
(45) Date of Patent: Sep. 26, 2017

(54) IMAGE PROCESSING APPARATUS AND IMAGE PROCESSING METHOD WHICH LEARN DICTIONARY

(71) Applicant: CANON KABUSHIKI KAISHA, Tokyo (JP)

(72) Inventors: Hiroyuki Uchiyama, Kawasaki (JP); Ichiro Umeda, Tokyo (JP); Muling Guo, Kawasaki (JP); Kotaro Yano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/750,051

(22) Filed: Jun. 25, 2015

(65) Prior Publication Data
US 2016/0004935 A1 Jan. 7, 2016

(30) Foreign Application Priority Data
Jul. 2, 2014 (JP) .................................. 2014-137149

(51) Int. Cl.
*G06K 9/62* (2006.01)
*G06T 7/73* (2017.01)
(Continued)

(52) U.S. Cl.
CPC .............. *G06T 7/74* (2017.01); *G06K 9/627* (2013.01); *G06K 9/6807* (2013.01); *G06K 9/00369* (2013.01); *G06T 2207/20081* (2013.01)

(58) Field of Classification Search
None
See application file for complete search history.

(56) References Cited

U.S. PATENT DOCUMENTS

2010/0067742 A1* 3/2010 Ogawa ............... G06K 9/00369
382/103
2010/0328452 A1* 12/2010 Jung .................... G06K 9/6206
348/135

(Continued)

FOREIGN PATENT DOCUMENTS

JP 2010-529529 A 8/2010

OTHER PUBLICATIONS

Sunderrajan, Santhoshkumar, and B. S. Manjunath. "Multiple view discriminative appearance modeling with IMCMC for distributed tracking." Distributed Smart Cameras (ICDSC), 2013 Seventh International Conference on. IEEE, 2013. 9 pages.*

(Continued)

*Primary Examiner* — Ryan P Potts
(74) *Attorney, Agent, or Firm* — Carter, DeLuca, Farrell & Schmidt, LLP

(57) ABSTRACT

An image processing apparatus includes a plurality of dictionaries configured to store a feature of an object and information on an imaging direction in a scene for each kind of imaged scene, a detecting unit configured to detect an object with reference to at least one of the plurality of dictionaries in the scene in which the object has been imaged and which is to be learned, an estimating unit configured to estimate the imaging direction the detected object, a selecting unit configured to select one dictionary from the plurality of dictionaries based on the imaging direction estimated by the estimating unit and the information on the imaging direction in each of the plurality of dictionaries, and a learning unit configured to learn the dictionary selected by the selecting unit, based on a detection result produced by the detecting unit.

7 Claims, 6 Drawing Sheets

(51) Int. Cl.
G06K 9/68 (2006.01)
G06K 9/00 (2006.01)

(56) References Cited

U.S. PATENT DOCUMENTS

2011/0142343 A1* 6/2011 Kim .................. G06K 9/38
382/173
2014/0093129 A1* 4/2014 Okumura ............ G06T 7/004
382/103
2014/0307917 A1* 10/2014 Mei .................. G06K 9/00624
382/103

OTHER PUBLICATIONS

Xie, Yuan, et al. "Discriminative object tracking via sparse representation and online dictionary learning." IEEE transactions on cybernetics 44.4 (2014): 539-553. 15 pages.*

Morency, Louis-Philippe, Jacob Whitehill, and Javier Movellan. "Monocular head pose estimation using generalized adaptive view-based appearance model." Image and Vision Computing 28.5 (2010): 754-761. 20 pages.*

Yang, Fan, Zhuolin Jiang, and Larry S. Davis. "Online discriminative dictionary learning for visual tracking." Applications of Computer Vision (WACV), 2014 IEEE Winter Conference on. IEEE, 2014. 10 pages.*

Ramirez, Ignacio, Pablo Sprechmann, and Guillermo Sapiro. "Classification and clustering via dictionary learning with structured incoherence and shared features." Computer Vision and Pattern Recognition (CVPR), 2010 IEEE Conference on. IEEE, 2010. 8 pages.*

Dalal et al., "Histograms of Oriented Gradients for Human Detection", CVPR2005, pp. 1-8.

Breitenstein et al., "Robust tracking-by-detection using a detector confidence particle filter", IEEE 12th International Conference ICCV 2009, pp. 1515-1522.

* cited by examiner

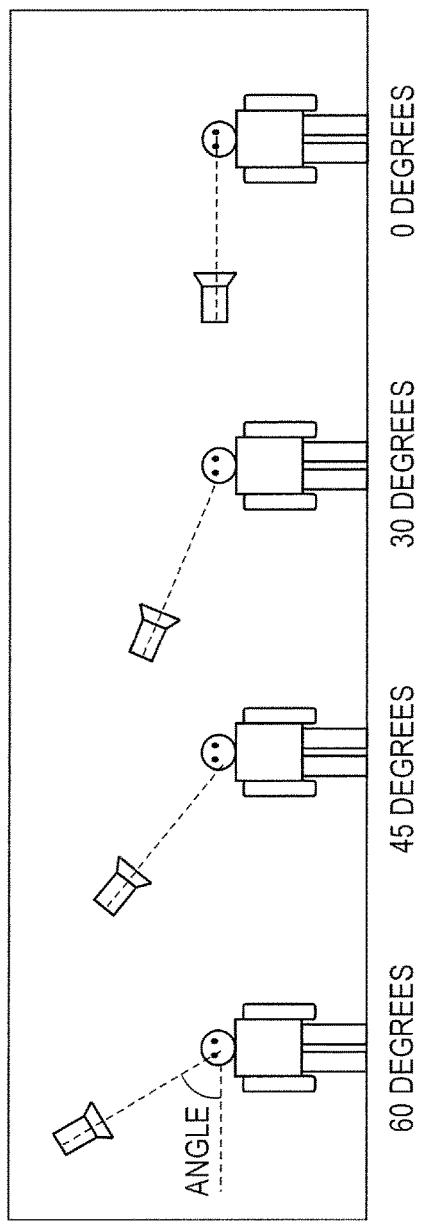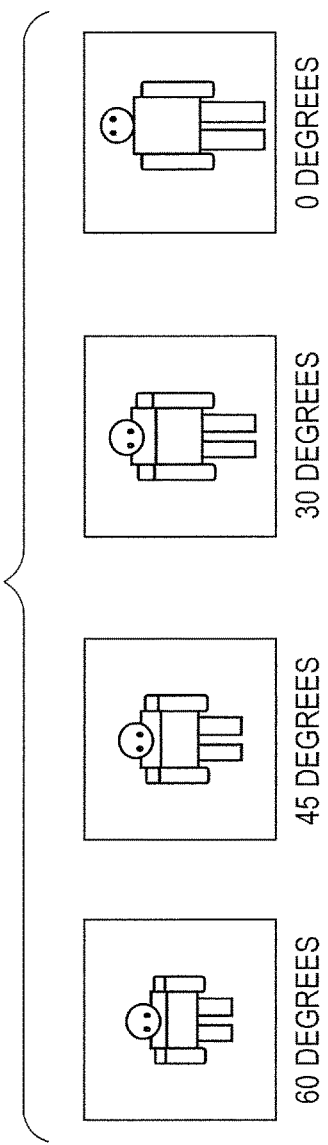

IMAGE PROCESSING APPARATUS AND IMAGE PROCESSING METHOD WHICH LEARN DICTIONARY

BACKGROUND OF THE INVENTION

Field of the Invention

The present invention relates to an image processing apparatus and image processing method suitably used to learn dictionaries of a detector for human figures or the like in particular.

Description of the Related Art

Conventionally, a method has been proposed for detecting human figures in an image taken by a camera (see, for example, Navneet Dalal and Bill Triggs "Histograms of Oriented Gradients for Human Detection", CVPR2005), According to a technique described in the document, a dictionary of a detector is learned in advance through machine learning of human images and background images. Subsequently, the dictionary is used to identify whether or not a local image of the image received from the camera shows a human figure, and detect the human figure. However, it is known that detection performance degrades if a photography scene and personal appearance of a human figure at the time of detection differ from personal appearance at the time of preliminary learning. Specifically, the differences in the photography scene include a difference in lighting conditions, difference in a shooting direction due to differences in an installation location and angle of the camera, the presence or absence of shade, a difference in the background, and the like. On the other hand, the differences in personal appearance include differences in orientation of the human figure and clothing.

Factors which degrade detection performance include the fact that learning samples collected at the time of preliminary learning cannot cover a diversity of photography scenes and personal appearances of detection objects. Thus, to solve this problem, a technique is proposed for improving detection performance by conducting additional learning of a preliminarily learned dictionary using learning samples for additional learning collected in photography scenes similar to the photography scene used at the time of detection. Japanese Patent Application Laid-Open No. 2010-529529 proposes a method for creating a dictionary for a Real AdaBoost classifier through preliminary learning and then adapting the dictionary to additional-learning samples further through additional learning.

However, with the method described in Japanese Patent Application Laid-Open No. 2010-529529, when there are great differences in the installation angle of the camera, in attributes such as color, sex, and age of the human figures in the image, in the background, and the like between preliminary learning and additional learning, there is a great difference in feature quantity needed for identification, and thus there is a limit on improvement of identification accuracy. Consider, for example, a case in which directions and intensities of edges are used as a feature quantity for identification. If there is a difference in the installation angle of the camera with respect to a human figure between preliminary learning and additional learning, the appearance positions, angles and intensities of the edges appearing in the image of the human figure vary. In such a case, the feature quantity of the detection object learned in preliminary learning is difficult to use in additional learning, and thus there is a limit on performance improvement. Also, when there is a great difference in background texture between preliminary learning and additional learning, there is similarly a great difference in the feature quantity needed for identification, and thus there is a limit on performance improvement.

SUMMARY OF THE INVENTION

An object of the present invention is to enable precise additional learning of a dictionary of a detector used in detecting an object.

According an aspect of the present invention, an image processing apparatus comprises: a plurality of dictionaries configured to store information of a feature and an imaging direction of an object in scenes of imaging, per each kind of the scenes; a detecting unit configured to detect the object from the scene in which the object is imaged and is subjected to a learning, by reference to at least one of the plurality of dictionaries; an estimating unit configured to estimate the imaging direction of the object detected; a selecting unit configured to select a dictionary from the plurality of dictionaries, based on the imaging direction estimated by the estimating unit and the information of the imaging direction stored in each of the plurality of dictionaries; and a learning unit configured to perform a learning of the selected dictionary based on a result of the detection by the detecting unit.

Further features of the present invention will become apparent from the following description of exemplary embodiments with reference to the attached drawings.

BRIEF DESCRIPTION OF THE DRAWINGS

FIGS. 5A and 5B are diagrams describing camera directions with respect to samples of a detection object.

DESCRIPTION OF THE EMBODIMENTS

Preferred embodiments of the present invention will now be described in detail in accordance with the accompanying drawings.

Figure 2:
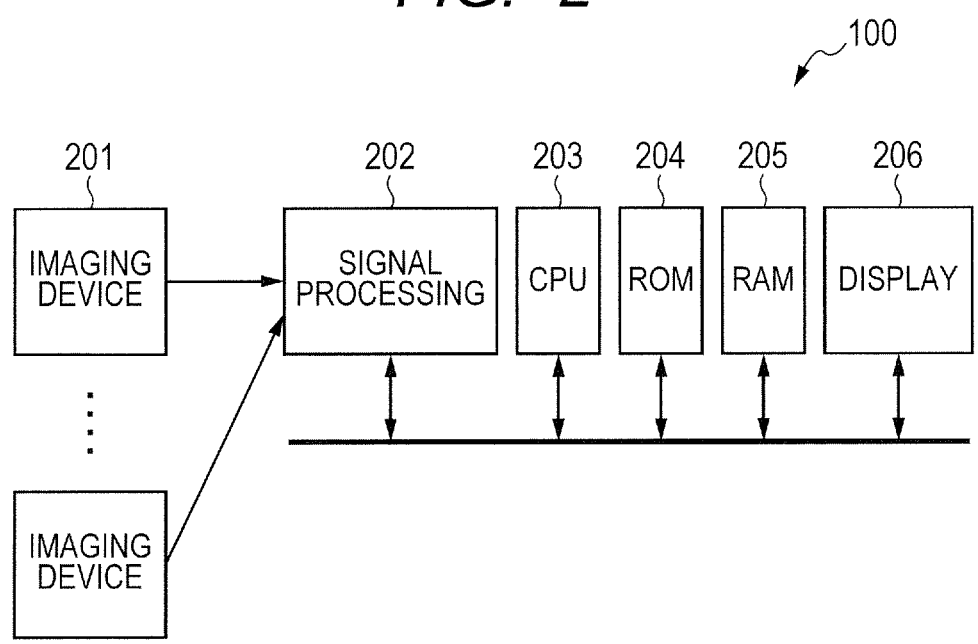
FIG. 2 is a block diagram showing an exemplary hardware configuration of the image recognition apparatus according to the embodiment.

FIG. 2 is a block diagram showing, an exemplary hardware configuration of an image recognition apparatus 100 according to an embodiment of the present invention.

In FIG. 2, there are plural imaging devices 201, each of which is an imaging unit made up of a CCD, CMOS, or the like and configured to convert an object image from light into electrical signal. A signal processing circuit 202 processes a time series signal of the object images obtained from the imaging devices 201 and converts the time series signal into a digital signal.

By executing a control program stored in a ROM 204, a CPU 203 controls the entire image recognition apparatus 100. The ROM 204 stores the control program executed by the CPU 203 as well as various parameter data. Here, being executed by the CPU 203, the control program causes the apparatus to function as various units configured to perform respective processes shown in flowcharts described later. A RAM 205 stores images and various information and functions as a work area for the CPU 203 and a temporary save area for data. A display 206 is a display device used to display images and the like.

Note that although in the present embodiment, processes corresponding to steps of the flowcharts described later are implemented by software using the CPU 203, some or all of the processes may be implemented by hardware such as electronic circuits. Also, the image recognition apparatus according to the present embodiment may be implemented using a general-purpose PC by omitting the imaging devices 201 and signal processing circuit 202 or implemented as a dedicated apparatus. Also, software (programs) acquired through a network or various storage media may be executed by a processing unit (CPU or processor) of a personal computer or the like.

Figure 1:
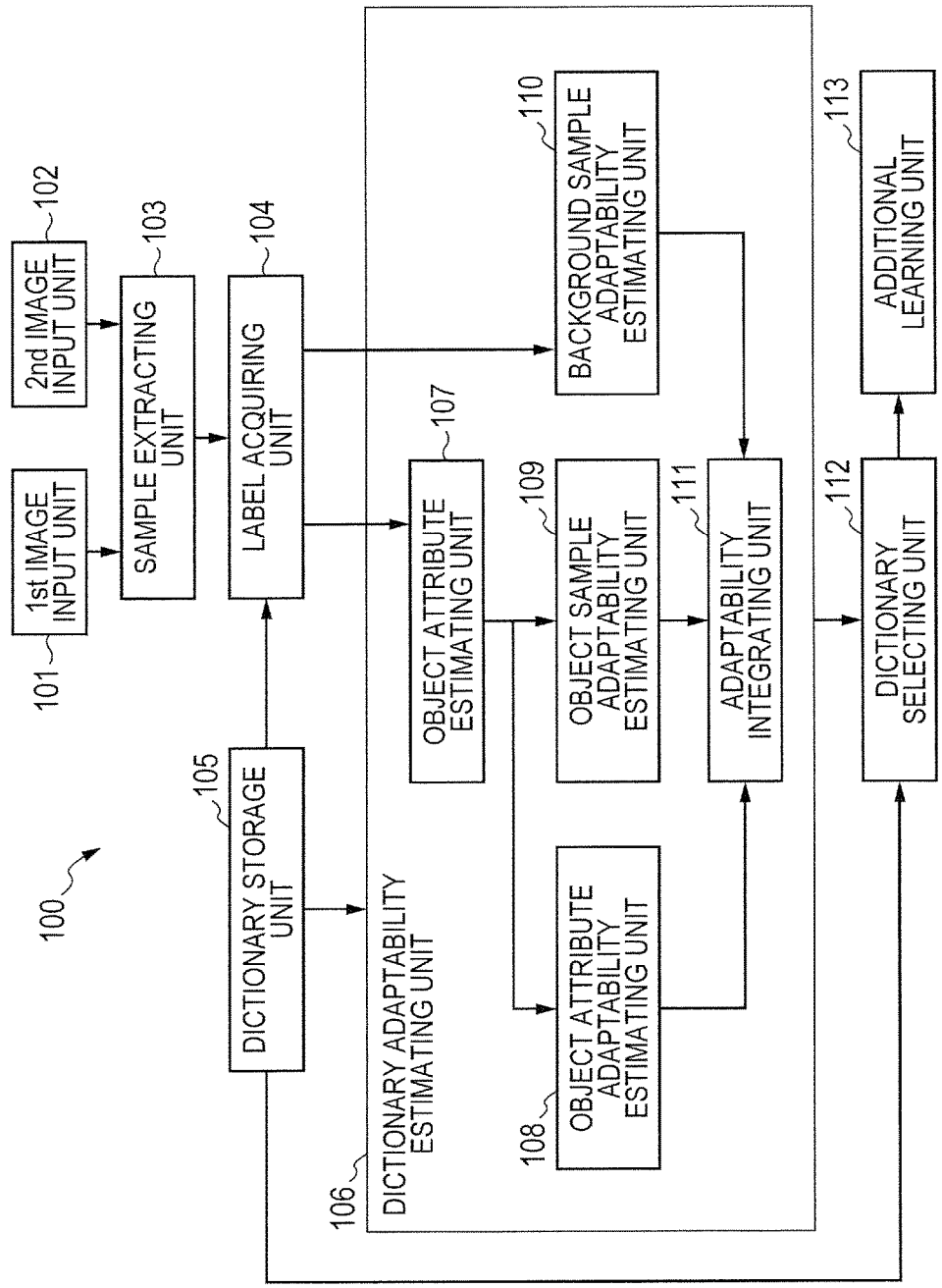
FIG. 1 is a block diagram showing an exemplary functional configuration of an image recognition apparatus according to an embodiment.

FIG. 1 is a block diagram showing an exemplary functional configuration of the image recognition apparatus 100 according to the present embodiment. As shown in FIG. 1, the image recognition apparatus 100 according to the present embodiment includes a first image input unit 101, a second image input unit 102, a sample extracting unit 103, a label acquiring unit 104, a dictionary storage unit 105, a dictionary adaptability estimating unit 106, a dictionary selecting unit 112 and an additional learning unit 113.

The first image input unit 101 acquires a video image taken by a camera. The second image input unit 102 acquires video images taken by plural cameras (hereinafter referred to as a group of other cameras) different from the camera which has taken the video image input to the first image input unit 101. Although in the present embodiment, it is assumed that the plural video images acquired by the second image input unit 102 are to in different scenes, video images taken in a same scene may be included. The different scenes as referred to in the present embodiment are assumed to mean scenes differing in the installation location or angle of the camera, but may be scenes differing in other photographic conditions such as a lighting condition or object distance. Hereinafter, video image input to the first image input unit 101 will be referred to as a newly introduced scene video image while a video image input to the second image input unit 102 will be referred to as an existing scene video image.

The sample extracting unit 103 extracts samples by cutting local images from a newly introduced scene video image acquired by the first image input unit 101 and an existing scene video image acquired by the second image input unit 102. A label acquiring unit 104 adds a label to each sample extracted by the sample extracting unit 103, the label indicating that the sample is a detection object or an object other than a detection object (background in the present embodiment). A method for adding a label will be described later.

The dictionary storage unit 105 stores object detector dictionaries learned beforehand in plural existing scenes. In other words, the dictionary storage unit 105 stores plural object detector dictionaries learned in the scenes taken by the group of other cameras. In the present embodiment, it is assumed that M dictionaries learned in M scenes are stored. Also, it is assumed in the present embodiment that as a classifier dictionary learned in Real AdaBoost, each dictionary is made up of plural lookup tables which make up a weak classifier. Note that although it is assumed that the dictionaries belong to classifiers learned in Real AdaBoost, the dictionaries may be based on another learning method or classifier. Furthermore, in creating a dictionary, a dictionary which has already been learned be updated through additional learning described in Japanese Patent Application Laid-Open No. 2010-529529.

The dictionary adaptability estimating unit 106 estimates adaptability of dictionaries to a newly introduced scene using a sample acquired by the sample extracting unit 103, a label acquired by the label acquiring unit 104, and plural dictionaries stored in the dictionary storage unit 105. According to the present embodiment, the adaptability is a reference index indicating similarity between a newly introduced scene and an existing scene, but another reference index may be used. The dictionary adaptability estimating unit 106 includes an object attribute estimating unit 107, an object attribute adaptability estimating unit 108, an object sample adaptability estimating unit 109, a background sample adaptability estimating unit 110 and an adaptability integrating unit 111.

The object attribute estimating unit 107 acquires an attribute of a sample of the detection object. According to the present embodiment, the attribute is the camera direction with respect to the detection object, but may be the color, age, sex, or another attribute of the detection object. The camera direction will be described later. The object attribute adaptability estimating unit 108 calculates the adaptability of dictionaries to a newly introduced scene using the attribute of the sample. The object sample adaptability estimating unit 109 calculates the adaptability of the dictionaries to newly introduced scene using the sample attribute, the sample of the detection object in the newly introduced scene, and the dictionaries stored in the dictionary storage unit 105.

The background sample adaptability estimating unit 110 calculates the adaptability of the dictionaries to the newly introduced scene using a sample of the background of the newly introduced scene and the dictionaries stored in the dictionary storage unit 105. The adaptability integrating unit 111 integrates the adaptability calculated by the object attribute adaptability estimating unit 108, object sample adaptability estimating unit 109 and background sample adaptability estimating unit 110.

The dictionary selecting unit 112 selects a suitable dictionary from the dictionaries stored in the dictionary storage unit 105 based on the adaptability calculated by the dictionary adaptability estimating unit 106. The additional learning unit 113 updates the selected dictionary using a sample of the newly introduced scene.

Operation of each component shown in FIG. 1 will be described below with reference to a flowchart of FIG. 3.

Figure 3:
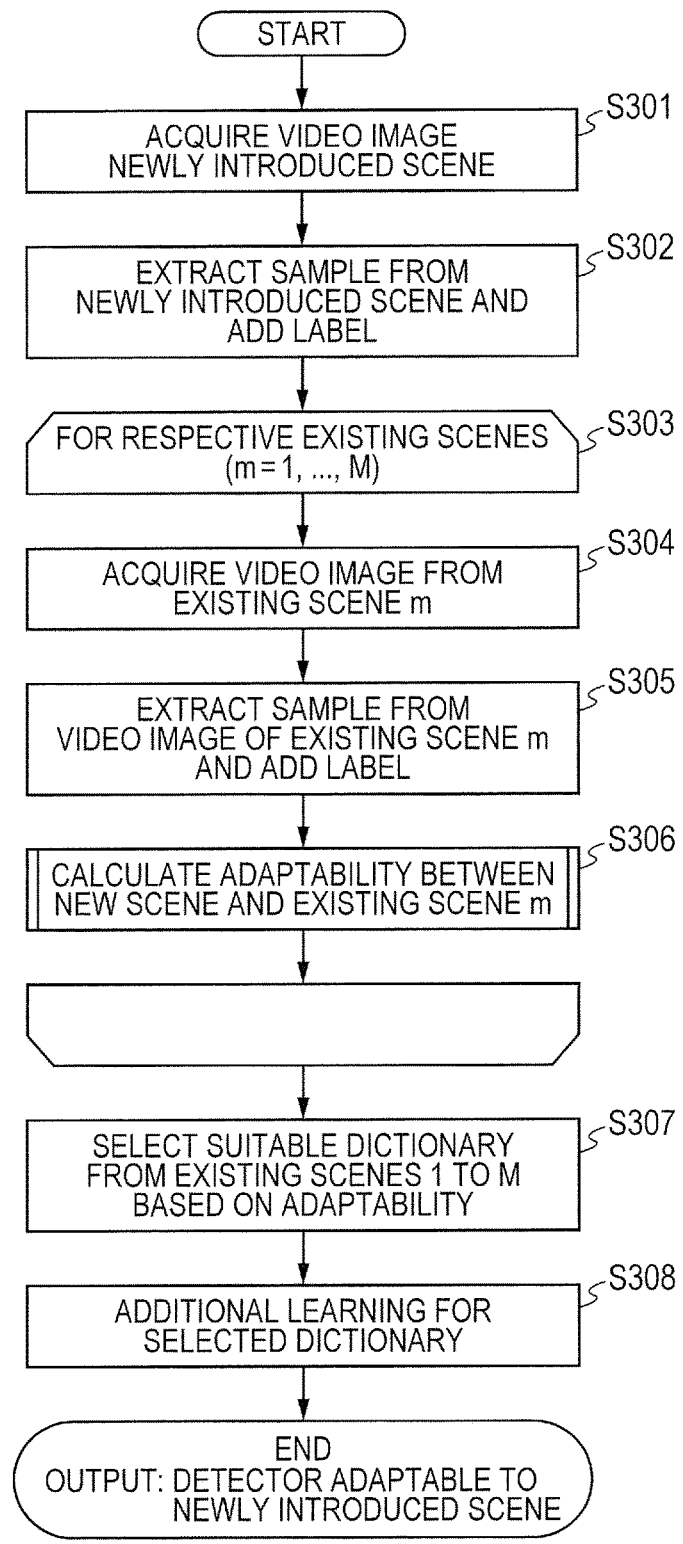
FIG. 3 is a flowchart showing an example of learning processing procedures of the image recognition apparatus according to the embodiment.

FIG. 3 is a flowchart showing an example of learning processing procedures of the image recognition apparatus 100 according to the present embodiment.

First, in step S301, the first image input unit 101 acquires a video image of a newly introduced scene.

Next, in step S302, the sample extracting unit 103 extracts samples of a detection object and samples of the background, which is a portion other than the object, from the video image of the newly introduced scene, and the label acquiring unit 104 adds labels to the extracted samples. Regarding these samples, predetermined numbers of samples are extracted.

Here, each of samples is extracted by cutting a local image of an arbitrary size from an arbitrary location of the video image. In adding a detection object label to each sample extracted from the newly introduced scene video image, used is tracking-by-detection described by M. P. Breitenstein et al., in "Robust tracking-by-detection using a detector confidence particle filter", ICCV2009. Specifically, first a detection process is performed by a detector. In so doing, to reduce false detection and improve reliability of detection, only detection results whose likelihood is higher than a predetermined threshold are adopted, where the likelihood represents the degree to which an output from the detector is likely to be a detection object. Next, object tracking is performed in subsequent video image frames using the detection result whose likelihood is higher than the threshold as an initial detection result. This allows a label to be added to a sample of a detection object which is difficult to detect using a detector alone.

Although the present embodiment uses tracking-by-detection in this way to add a detection object label, alternatively a label may be added manually by a user via a control panel (not shown). Also an initial detection result may be entered manually by the user via the control panel (not shown) and a label may be added by object tracking.

Next, in adding a background label to an extracted sample, the background label is added to a sample extracted from a video image frame which does not contain any detection object. In the present embodiment, the background label is added to a sample of any size extracted at any position coordinates, but the background label may alternatively be added only to hard negative samples which are background samples hard to identify. That is, the background label may be added only to local images whose likelihood of being a detection object is higher than a predetermined value. In this way, the use of only hard negative samples offers the effect of efficiently selecting samples prone to cause false identification from a set of many background samples.

As described above, to add the background label, the sample cut from a video image frame containing no detection object is processed. Alternatively, a sample extracted from the area of the video image excluding the detection object area may be processed, using moving object detection based on background subtraction, tracking-by-detection described above, or the like.

In the loop starting from step S303, the processes of step S304 to step S306 are repeated for each of M existing scene video images.

First in step S304, the second image input unit 102 acquires an existing scene video image from one camera in the group of other cameras. Then in step S305, the sample extracting unit 103 extracts a sample of the background from the existing scene video image and the label acquiring unit 104 adds a label to the extracted sample of the background. This process is performed in a manner similar to step S302.

Next, in step S306, the dictionary adaptability estimating unit 106 calculates the adaptability between dictionaries for a newly introduced scene video image and the existing scene video image. Note that a detailed process of this step will be described later. In this way, the processes of step S304 to step S306 are repeated for each existing scene video image.

Next, in step S307, based on the adaptability of dictionaries to each existing scene video image calculated in the loop of step S303, the dictionary selecting unit 112 selects a dictionary suitable for updating from among the dictionaries stored in the dictionary storage unit 105. Although in the present embodiment, the dictionary with the highest adaptability is selected, another method may be used for the selection.

Then, in step S308, using the sample extracted in step S302, the additional learning unit 113 additionally learns and updates the dictionary selected in step S307. As a method of additional learning, the present embodiment uses a technique described in Japanese Patent Application Laid-Open No. 2010-529529. Specifically, values of lookup tables which make up a Real AdaBoost weak classifier are updated using a positive sample and negative sample. Note that the method of additional learning is not limited to this method, and another method may be used.

Next, details of the process of step S306 performed by the dictionary adaptability estimating unit 106 will be described with reference to FIG. 4.

Figure 4:
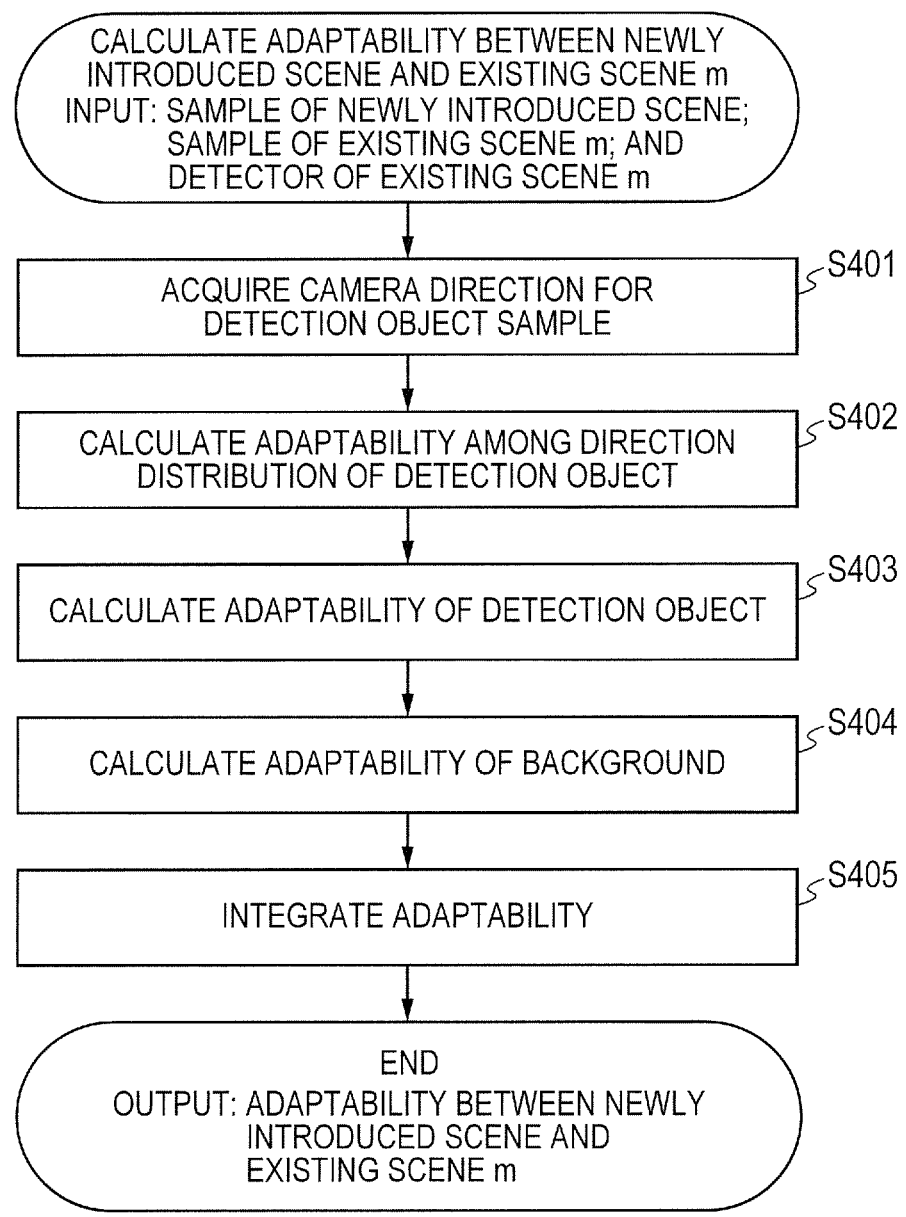
FIG. 4 is a flowchart showing an example of detailed processing procedures for calculating adaptability between dictionaries for a video image of a newly introduced scene and a video image of an existing scene.

FIG. 4 is a flowchart showing an example of detailed processing procedures in step S306 of FIG. 3.

First, in step S401, the object attribute estimating unit 107 acquires the attribute of samples of the detection object in the newly introduced scene video image and existing scene video image, i.e., the camera direction with respect to the samples of the detection object. In the present embodiment, as shown in FIG. 5A, the camera direction is classified into any of 0-degree, 30-degree, 45-degree, and 60-degree directions in terms of elevation angle.

To acquire the camera directions of samples, detectors configured to detect objects only in specific directions are prepared in advance. For example, as shown in FIG. 5B, detectors are prepared which have learned using detection object sample groups obtained by photographing detection objects in camera directions of 0 degrees, 30 degrees, 45 degrees, and 60 degrees, respectively, in terms of elevation angle. Then, the detectors in respective camera directions are applied to each sample and the direction corresponding to the detector which has output the highest likelihood is established as the camera direction of the sample.

Although in the present embodiment, detectors configured to detect objects only in specific camera directions are prepared in advance, direction classifiers for detection objects may be prepared by another method. Also, the direction of the detection object may be entered manually by the user via the control panel (not shown), acquired by external sensors configured to acquire the position of the detection object, acquired from prior knowledge about the installation location or angle of the camera, or the like. Also, if detectors of the existing scene video image are designed to be able to output not only the likelihood of the detection object, but also the direction of the detection object, the detectors may be used instead. Also, although the angular direction of the elevation angle of the camera is used in the present embodiment, the yaw angle, pitch angle, roll angle, or the like of the detection object or combination thereof may be used.

Next, in step S402, based on the camera directions of the detection object samples in the newly introduced scene video image and existing scene video image acquired in step S401, the object attribute adaptability estimating unit 108 creates direction distributions of respective scenes. Then, by calculating dissimilarity between the direction distributions, the object attribute adaptability estimating unit 108 calculates adaptability.

Figure 6:
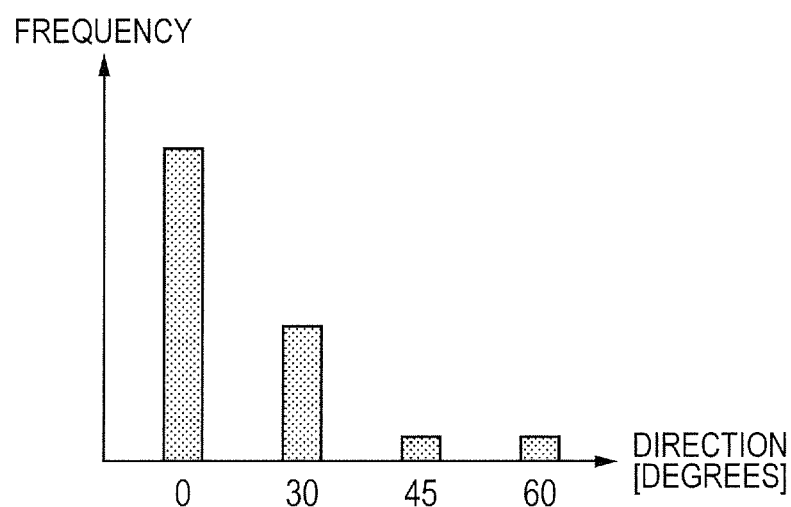
FIG. 6 is diagram showing an example of a camera direction distribution for a video image of a newly introduced scene or a video image of an existing scene.

In step S402, first a sample direction distribution of the detection object in each scene is created as shown in FIG. 6. This process is performed by counting the number of samples in each camera direction based on the camera directions acquired in step S401. Next, the direction distributions are compared between the newly introduced scene video image and existing scene video image. Although KL divergence is used in the present embodiment for the comparison of direction distributions, another reference index such as histogram intersection or Earth Mover's Distance may be used. A value opposite in sign to the result of comparison between the distributions is established as adaptability $S_{dist}$ between direction distributions between the scenes. In this way, as the dissimilarity between direction distributions is taken into account in determining the adaptability between scenes, an existing scene video image similar in occurrence tendency of the detection object direction comes to be readily selected. Consequently, an existing scene video image similar in the installation location and angle of the camera comes to be readily selected.

In the present embodiment, the object attribute adaptability estimating unit 108 estimates adaptability based on the distribution of camera directions with respect to the detection object as with step S402. However, the adaptability may be estimated based on the camera direction with respect to the detection object by another method without using a distribution. For example, average values of direction angles may be calculated separately for a newly introduced scene video image and existing scene video image, and adaptability may be estimated by comparing the calculated values.

Next, in step S403, the object sample adaptability estimating unit 109 calculates the adaptability of detection object samples. First, the detector of the existing scene video image outputs the likelihood which represents the degree to which a given sample is likely to be a sample of the detection object. A high likelihood of being a detection object sample means that the detector is properly suited to the sample. Thus, an average value of the likelihood is used in calculating the adaptability of a detection object sample. Here, if $X_{pos}$ is a detection object sample group in an existing scene video image and $|X_{pos}|$ is the number of $X_{pos}$'s and x is a sample in $X_{pos}$ and $H(x)$ is the likelihood output by the detector, then the adaptability $S_{pos}$ of the detection object sample is given by Eq. (1) below.

$$S_{pos} = \frac{1}{|X_{pos}|} \sum_{x \in X_{pos}} H(x) \qquad (1)$$

In calculating the adaptability $S_{pos}$ of the detection object sample, the camera direction with respect to the detection object sample is not allowed for by Eq. (1), but may be taken into consideration. For example, using Eqs. (2) and (3) below instead of Eq. (1), the adaptability $S_{pos}$ of the detection object sample may be found by calculating average likelihood $T(X_{pos}^d)$ for each camera direction and then further averaging the average likelihood values.

$$S_{pos} = \frac{1}{|D|} \sum_{d \in D} T(X_{pos}^d) \qquad (2)$$

$$T(X_{pos}^d) = \frac{1}{|X_{pos}^d|} \sum_{x \in X_{pos}^d} H(x) \qquad (3)$$

where D is a set of directions, |D| is the number of directions, d is a direction, and $X_{pos}^d$ is a sample group of a detection object in an existing scene video image having the direction d.

Next, in step S404, the background sample adaptability estimating unit 110 calculates the adaptability of background samples. Contrary to step S403, the lower the likelihood which represents the degree to which a given sample is likely to be a sample of the detection object, the higher the degree to which the sample belongs to the background. Consequently, a low likelihood of being a background sample means that the detector is properly suited to the sample. Thus, in calculating the adaptability of a background sample, a value opposite in sign to the average value of likelihood is used. Here, if $X_{neg}$ is a background sample group in an existing scene and $|X_{neg}|$ is the number of $X_{neg}$'s and x is a sample in $X_{neg}$ and $H(x)$ is the likelihood output by the detector, then the adaptability $S_{neg}$ of the background sample is given by Eq. (4) next.

$$S_{neg} = -\frac{1}{|X_{neg}|} \sum_{x \in X_{neg}} H(x) \qquad (4)$$

Next, in step S405, the adaptability integrating unit 111 integrates three types of adaptability calculated in step S402 to step S404 and calculates final adaptability between the newly introduced scene video image and existing scene video image. In the present embodiment, a linear sum of the three types of adaptability is established as the final adaptability. If $S_{dist}$ is the adaptability between the scenes and $S_{pos}$ is the adaptability of the detection object sample and $S_{neg}$ is the adaptability of the background sample, then the final adaptability is given by Eq. (5) next.

$$S = \lambda_{dist} S_{dist} + \lambda_{pos} S_{pos} + \lambda_{neg} S_{neg} \qquad (5)$$

where $\lambda_{dist}$, $\lambda_{pos}$ and $\lambda_{neg}$ are weighting factors set in advance. Although the present embodiment uses the adaptability S by integrating the adaptability $S_{dist}$ between the direction distributions of the scenes, adaptability $S_{pos}$ of the detection object sample, and adaptability $S_{neg}$ of the background sample, the adaptability S may be established by integrating at least any one type of adaptability. In that case, only necessary adaptability may be calculated out of $S_{dist}$, $S_{pos}$, and $S_{neg}$.

As described above, according to the present embodiment, additional learning is conducted based on a detector of an existing scene video image highly compatible with a newly introduced scene video image. This allows a highly compatible feature quantity used in preliminary learning to be used in additional learning and thereby enables improvement of identification accuracy. Also, a repetition process of the additional learning can be started with a suitable initial value, thereby facilitating convergence of the repetition process and reducing calculation cost for the additional learning. For example, when a camera is installed in a new environment, if learning is conducted based on a detector of an existing scene video image and the detector has gone through learning in another similar location, improved identification accuracy and faster learning can be expected.

Also, the adaptability of the detection object, adaptability of the background object, and adaptability between the direction distributions of the detection object are used to select a detector dictionary used for additional learning. Since the use of the adaptability of the detection object allows the use of a feature quantity which enables proper identification of the detection object obtained by preliminary learning, identification accuracy can be improved. Also, since the use of the adaptability of the background object similarly allows the use of a feature quantity which enables proper identification of the background obtained by preliminary learning, identification accuracy can be improved. Furthermore, the use of the adaptability between the direction distributions of the detection object, i.e., the use of the adaptability of a detection object attribute, allows selection of an existing scene video image similar in occurrence tendency of the detection object attribute to the newly introduced scene video image. Thus, improved reliability of selection and consequent improvement of identification accuracy can be expected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s) The computer may comprise one or more processors (e.g., central processing unit (CPU), micro processing unit (MPU)) and may include network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-137149, filed Jul. 2, 2014, which is hereby incorporated by reference herein in its entirety.

What is claimed is:

1. An image processing apparatus comprising:
one or more processors; and
at least one memory coupled to the one or more processors, the at least one memory having stored thereon, a plurality of dictionaries configured to store information, each of the dictionaries learned by using a respective one of a plurality of existing scenes, and instructions which, when executed by the one or more processors, cause the image processing apparatus to:
    extract a sample of an object and a sample of a background from a new scene,
    estimate respective object adaptability of the plurality of dictionaries to the sample of the object extracted from the new scene based on the sample of the object and the information stored in each of the plurality of dictionaries,
    estimate respective background adaptability of the plurality of dictionaries to the sample of the background extracted from the new scene based on the sample of the background and the information stored in each of the plurality of dictionaries,
    integrate the respective object adaptability of the plurality of dictionaries to the sample of the object and the respective background adaptability of the plurality of dictionaries to the sample of the background to obtain respective total adaptability of the plurality of dictionaries to the new scene,
    select a dictionary from the plurality of dictionaries, based on the respective total adaptability of the plurality of dictionaries to the new scene, and
    perform a learning of the selected dictionary using the sample of the object and the sample of the background extracted from the new scene.

2. The image processing apparatus according to claim 1, wherein the at least one memory has further instructions stored thereon which, when executed by the one or more processors, cause the image processing apparatus to:
    for each of the plurality of dictionaries, estimate an imaging direction and a direction adaptability.

3. The image processing apparatus according to claim 2, wherein the at least one memory has further instructions stored thereon which, when executed by the one or more processors, cause the image processing apparatus to:
    estimate each said direction adaptability based on distribution information of all the estimated imaging directions.

4. The image processing apparatus according to claim 1, wherein the at least one memory includes further instructions which, when executed by the one or more processors, cause the image processing apparatus to:
    estimate an attribute of the sample of the object extracted from the new scene, and
    estimate respective attribute adaptability of the plurality of dictionaries to the new scene based on the attribute of the sample of the object,
    wherein the respective total adaptability of the plurality of dictionaries to the new scene is obtained by integrating the respective object adaptability of the plurality of dictionaries to the sample of the object, the respective background adaptability of the plurality of dictionaries to the sample of the background, and the respective attribute adaptability of the plurality of dictionaries to the new scene.

5. The image processing apparatus according to claim 4, wherein the attribute of the sample of the object includes an imaging direction.

6. An image processing method performed by an image processing apparatus which comprises a plurality of dictionaries configured to store information, each of the dictionaries learned by using a respective one of a plurality of existing scenes, the method comprising:
    extracting a sample of an object and a sample of a background from a new scene;
    estimating respective object adaptability of the plurality of dictionaries to the sample of the object extracted from the new scene based on the sample of the object and the information stored in each of the plurality of dictionaries;
    estimating respective background adaptability of the plurality of dictionaries to the sample of the background extracted from the new scene based on the sample of the background and the information stored in each of the plurality of dictionaries:
    integrating the respective object adaptability of the plurality of dictionaries to the sample of the object and the respective background adaptability of the plurality of dictionaries to the sample of the background to obtain respective total adaptability of the plurality of dictionaries to the new scene;

selecting a dictionary from the plurality of dictionaries, based on the respective total adaptability of the plurality of dictionaries to the new scene; and performing a learning of the selected dictionary using the sample of the object and the sample of the background extracted from the new scene.

7. A non-transitory computer-readable recording medium storing a readable program for operating a computer to execute an image processing method performed by an image processing apparatus which comprises a plurality of dictionaries configured to store information, each of the dictionaries learned by using a respective one of a plurality of existing scenes, the method comprising:

extracting a sample of an object and a sample of a background from a new scene;

estimating respective object adaptability of the plurality of dictionaries to the sample of the object extracted from the new scene based on the sample of the object and the information stored in each of the plurality of dictionaries;

estimating respective background adaptability of the plurality of dictionaries to the sample of the background extracted from the new scene based on the sample of the background and the information stored in each of the plurality of dictionaries;

integrating the respective object adaptability of the plurality of dictionaries to the sample of the object and the respective background adaptability of the plurality of dictionaries to the sample of the background to obtain respective total adaptability of the plurality of dictionaries to the new scene;

selecting a dictionary from the plurality of dictionaries, based on the respective total adaptability of the plurality of dictionaries to the new scene; and performing a learning of the selected dictionary using the sample of the object and the sample of the background extracted from the new scene.

* * * * *